(12) United States Patent
Yi et al.

(10) Patent No.: US 10,172,165 B2
(45) Date of Patent: Jan. 1, 2019

(54) METHOD FOR CONFIGURING A MAC PDU FOR D2D COMMUNICATION SYSTEM AND DEVICE THEREFOR

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 95 days.

(21) Appl. No.: 15/037,229

(22) PCT Filed: Jan. 16, 2015

(86) PCT No.: PCT/KR2015/000477
§ 371 (c)(1),
(2) Date: May 17, 2016

(87) PCT Pub. No.: WO2015/115743
PCT Pub. Date: Aug. 6, 2015

(65) Prior Publication Data
US 2016/0302248 A1 Oct. 13, 2016

Related U.S. Application Data

(60) Provisional application No. 61/932,812, filed on Jan. 29, 2014.

(51) Int. Cl.
*H04W 76/02* (2009.01)
*H04W 72/12* (2009.01)
(Continued)

(52) U.S. Cl.
CPC .......... *H04W 76/023* (2013.01); *H04H 20/38* (2013.01); *H04J 11/00* (2013.01);
(Continued)

(58) Field of Classification Search
None
See application file for complete search history.

(56) References Cited

U.S. PATENT DOCUMENTS

2011/0299492 A1* 12/2011 Lee .................. H04W 4/00
370/329
2012/0226822 A1 9/2012 Norair
(Continued)

FOREIGN PATENT DOCUMENTS

CN 102711176 A 10/2012
RU 2008133596 A 2/2010
(Continued)

OTHER PUBLICATIONS

Catt, "MAC functions for D2D communication," 3GPP TSG RAN WG2 Meeting #85, R2-140071, Prague, Czech Republic, Feb. 10-14, 2014, pp. 1-4.
(Continued)

*Primary Examiner* — Candal Elpenord
(74) *Attorney, Agent, or Firm* — Birch, Stewart, Kolasch & Birch, LLP

(57) ABSTRACT

The present invention relates to a wireless communication system. More specifically, the present invention relates to a method and a device for constructing a MAC PDU for D2D communication system, the method comprising: constructing, by a first UE, a MAC PDU including a source ID, a target ID, a plurality of logical channel IDs and a plurality of MAC SDUs, wherein each MAC SDU is transmitted from the first UE identified by the source ID to each second UE identified by the target ID via a logical channel identified by one of the plurality of logical channel IDs; transmitting the MAC PDU to at least one second UE via an interface, wherein the interface is configured between the first UE and the at least one second UE directly.

6 Claims, 13 Drawing Sheets

(51) Int. Cl.
| | |
|---|---|
| *H04J 11/00* | (2006.01) |
| *H04W 4/00* | (2018.01) |
| *H04W 72/04* | (2009.01) |
| *H04L 1/18* | (2006.01) |
| *H04W 64/00* | (2009.01) |
| *H04W 4/02* | (2018.01) |
| *H04L 29/12* | (2006.01) |
| *H04H 20/38* | (2008.01) |
| *H04W 80/02* | (2009.01) |
| *H04W 4/80* | (2018.01) |
| *H04W 76/14* | (2018.01) |
| *H04W 88/06* | (2009.01) |
| *H04W 88/08* | (2009.01) |
| *H04W 88/16* | (2009.01) |

(52) U.S. Cl.
CPC ........ *H04L 1/1812* (2013.01); *H04L 61/6022* (2013.01); *H04W 4/023* (2013.01); *H04W 4/80* (2018.02); *H04W 64/003* (2013.01); *H04W 72/042* (2013.01); *H04W 72/0413* (2013.01); *H04W 72/1215* (2013.01); *H04W 76/14* (2018.02); *H04W 80/02* (2013.01); *H04M 2203/655* (2013.01); *H04W 88/06* (2013.01); *H04W 88/08* (2013.01); *H04W 88/16* (2013.01)

(56) References Cited

U.S. PATENT DOCUMENTS

| | | |
|---|---|---|
| 2014/0010179 A1 | 1/2014 | Lee et al. |
| 2015/0045078 A1 | 2/2015 | Lee et al. |
| 2015/0085791 A1* | 3/2015 | Baghel .................. H04W 4/06 370/329 |
| 2015/0105113 A1 | 4/2015 | Lee et al. |
| 2015/0124646 A1* | 5/2015 | Yun .................. H04W 4/06 370/254 |

FOREIGN PATENT DOCUMENTS

| | | |
|---|---|---|
| WO | WO 2010/137004 A1 | 12/2010 |
| WO | WO 2013/141483 A1 | 9/2013 |
| WO | WO 2013/154328 A1 | 10/2013 |
| WO | WO 2013/181515 A2 | 12/2013 |
| WO | WO 2013/191353 A1 | 12/2013 |

OTHER PUBLICATIONS

Etri, "Considerations on MAC header for D2D one-to-many Communication," 3GPP TSG-RAN WG2 #85, R2-140796, Prague, Czech Republic, Feb. 10-14, 2014, pp. 1-3.

Intel Corporation, "MAC PDU format for D2D 1:M communication," 3GPP TSG RAN WG2 Meeting #84, R2-134293, San Francisco, U.S.A., Nov. 11-15, 2013, 2 pages.

Itri, "On D2D Communications Logical Channel," 3GPP TSG RAN2 Meeting #85, R2-140174, Prague, Czech Republic, Feb. 10-14, 2014, pp. 1-2.

RAN2, "LS on text proposal for TR 36.843 on D2D," 3GPP TSG-RAN WG2 #85, R2-141009, Prague, Czech Republic, Feb. 10-14, 2014, 1 page.

Qualcomm Incorporated, "D2D Broadcast Communication for Public Safety," 3GPP TSG-RAN WG2 #83 Bis, R2-133484, Ljubljana, Slovenia, Oct. 7-11, 2013 (server date Sep. 27, 2013; downloaded by EPO on Sep. 28, 2013), pp. 1-8.

Catt, "Message Flow for D2D Discovery", 3GPP TSG RAN WG2 Meeting #84, R2-134063, San Francisco, USA, Nov. 11-15, 2013, pp. 1-4.

Qualcomm Incorporated (Rapporteur), "TP for TR 36.843 Capturing Agreements from RAN2 #84", 3GPP TSG-RAN WG2 #84, R2-134589, San Francisco, USA, Nov. 11-15, 2013, 6 pages.

* cited by examiner (a) Control-Plane Protocol Stack (b) User-Plane Protocol Stack R/R/E/LCID/F/L sub-header with
7-bits L field R/R/E/LCID/F/L sub-header with
15-bits L field R/R/E/LCID sub-header

METHOD FOR CONFIGURING A MAC PDU FOR D2D COMMUNICATION SYSTEM AND DEVICE THEREFOR

CROSS REFERENCE TO RELATED APPLICATIONS

This application is the National Phase of PCT/KR2015/000477 filed on Jan. 16, 2015, which claims priority under 35 U.S.C. § 119(e) to U.S. Provisional Application No. 61/932,812 filed on Jan. 29, 2014, all of which are hereby expressly incorporated by reference into the present application.

TECHNICAL FIELD

The present invention relates to a wireless communication system and, more particularly, to a method for configuring a MAC PDU (Medium Access Control Protocol Data Unit) for D2D (Device-to-Device) communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARM)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Device to device (D2D) communication refers to the distributed communication technology that directly transfers traffic between adjacent nodes without using infrastructure such as a base station. In a D2D communication environment, each node such as a portable terminal discovers user equipment physically adjacent thereto and transmits traffic after setting communication session. In this way, since D2D communication may solve traffic overload by distributing traffic concentrated into the base station, the D2D communication may have received attention as the element technology of the next generation mobile communication technology after 4G. For this reason, the standard institute such as 3GPP or IEEE has proceeded to establish the D2D communication standard on the basis of LTE-A or Wi-Fi, and Qualcomm has developed their own D2D communication technology.

It is expected that the D2D communication contributes to increase through-put of a mobile communication system and create new communication services. Also, the D2D communication may support proximity based social network services or network game services. The problem of link of a user equipment located at a shade zone may be solved by using a D2D link as a relay. In this way, it is expected that the D2D technology will provide new services in various fields.

The D2D communication technologies such as infrared communication, ZigBee, radio frequency identification (RFID) and near field communications (NFC) based on the RFID have been already used. However, since these technologies support communication only of a specific object within a limited distance (about 1 m), it is difficult for the technologies to be regarded as the D2D communication technologies strictly.

Although the D2D communication has been described as above, details of a method for transmitting data from a plurality of D2D user equipments with the same resource have not been suggested.

DISCLOSURE

Technical Problem

An object of the present invention devised to solve the problem lies in a method and device for configuring a MAC PDU for D2D communication system. The technical problems solved by the present invention are not limited to the above technical problems and those skilled in the art may understand other technical problems from the following description.

Technical Solution

The object of the present invention can be achieved by providing a method for a User Equipment (UE) operating in a wireless communication system, the method comprising: constructing, by a first UE, a MAC PDU including a source ID, a target ID, a plurality of logical channel IDs and a plurality of MAC SDUs (Service Data Units), wherein each MAC SDU is transmitted from the first UE identified by the source ID to each second UE identified by the target ID via a logical channel identified by one of the plurality of logical channel IDs; transmitting the MAC PDU to at least one second UE via an interface, wherein the interface is configured between the first UE and the at least one second UE directly.

In another aspect of the present invention, provided herein is a UE (User Equipment) for performing random access procedure in a wireless communication system, the UE comprising: an RF (Radio Frequency) module; and a processor configured to control the RF module, wherein the processor is configured to construct a MAC PDU including a source ID, a target ID, a plurality of logical channel IDs and a plurality of MAC SDUs, wherein each MAC SDU is transmitted from the first UE identified by the source ID to each second UE identified by the target ID via a logical channel identified by one of the plurality of logical channel IDs, to transmit the MAC PDU to at least one second UE via an interface, wherein the interface is configured between the first UE and the at least one second UE directly.

Meanwhile, In another aspect of the present invention, provided herein is a method for a User Equipment (UE) operating in a wireless communication system, the method comprising: receiving, by a second UE, a MAC PDU including a source ID, a target ID, a plurality of logical channel IDs and a plurality of MAC SDUs from at least one first UE via an inter-face, wherein the interface is configured between the second UE and the at least one first UE directly; processing the MAC PDU, wherein each MAC SDU is transmitted from the first UE identified by the source ID to each second UE identified by the target ID via a logical channel identified by one of the plurality of logical channel IDs.

In another aspect of the present invention, provided herein is a UE (User Equipment) for performing random access procedure in a wireless communication system, the UE comprising: an RF (Radio Frequency) module; and a processor configured to control the RF module, wherein the processor is configured to receive a MAC PDU including a source ID, a target ID, a plurality of logical channel IDs and a plurality of MAC SDUs from at least one first UE via an interface, wherein the interface is configured between the second UE and the at least one first UE directly, and to process the MAC PDU, wherein each MAC SDU is transmitted from the first UE identified by the source ID to each second UE identified by the target ID via a logical channel identified by one of the plurality of logical channel IDs.

Preferably, the source ID is in a first field, the target ID is in a second field, the logical channel IDs are in a plurality of third fields and the plurality of MAC SDUs are in a plurality of fourth fields, respectively.

Preferably, the source ID and the target ID are IDs used in an MAC entity.

Preferably, the method further comprises: discarding the MAC PDU if the target ID doesn't match any of IDs managed by the second UE.

Preferably, the method further comprises: parsing the MAC PDU if the target ID matches one of IDs managed by the second UE.

It is to be understood that both the foregoing general description and the following detailed description of the present invention are exemplary and explanatory and are intended to provide further explanation of the invention as claimed.

Advantageous Effects

According to the present invention, a MAC PDU can be efficiently configured in D2D communication system. It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
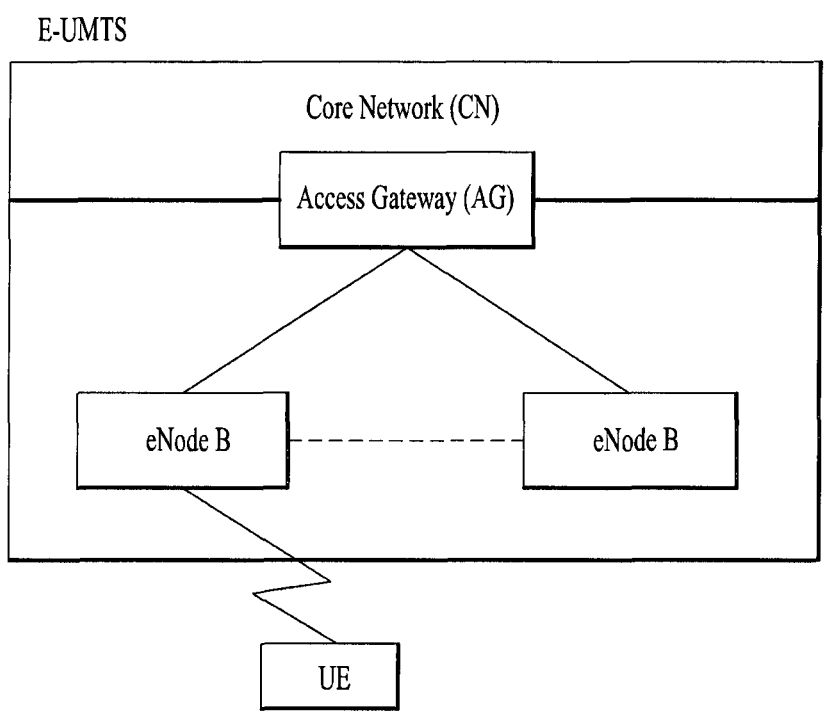
FIG. 1 is a diagram showing a network structure of an Evolved Universal Mobile Telecommunications System (E-UMTS) as an example of a wireless communication system.
Figure 2A:
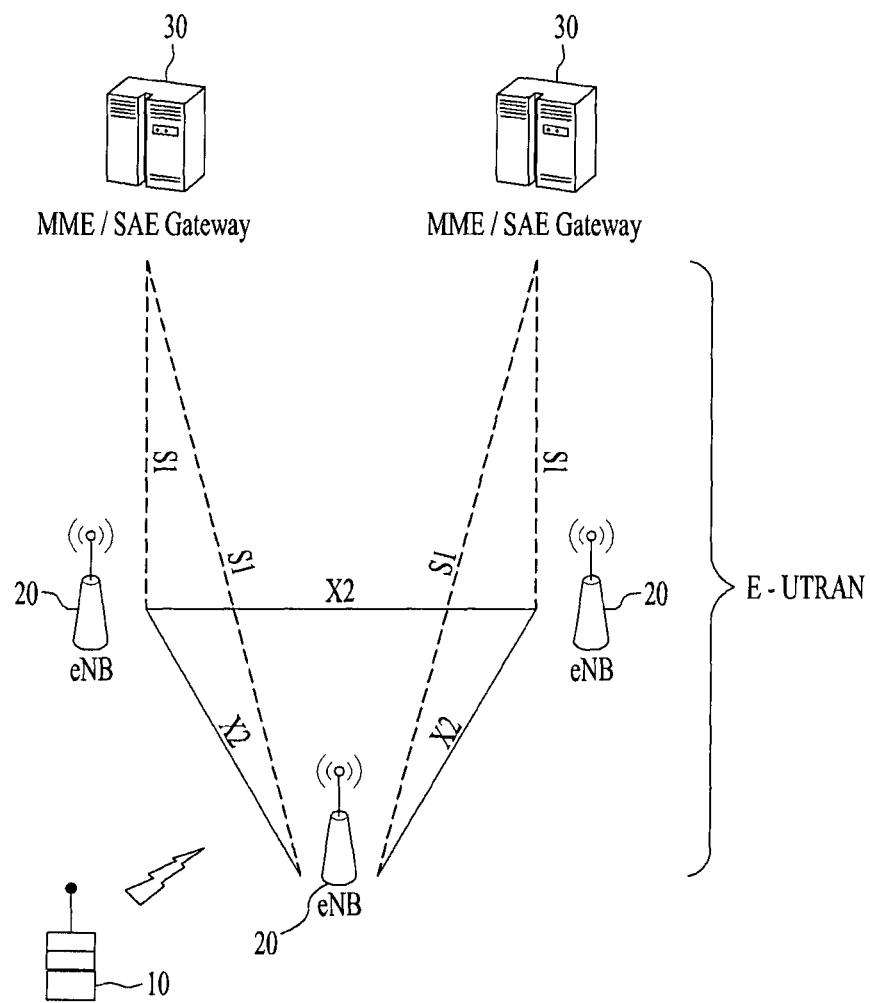
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
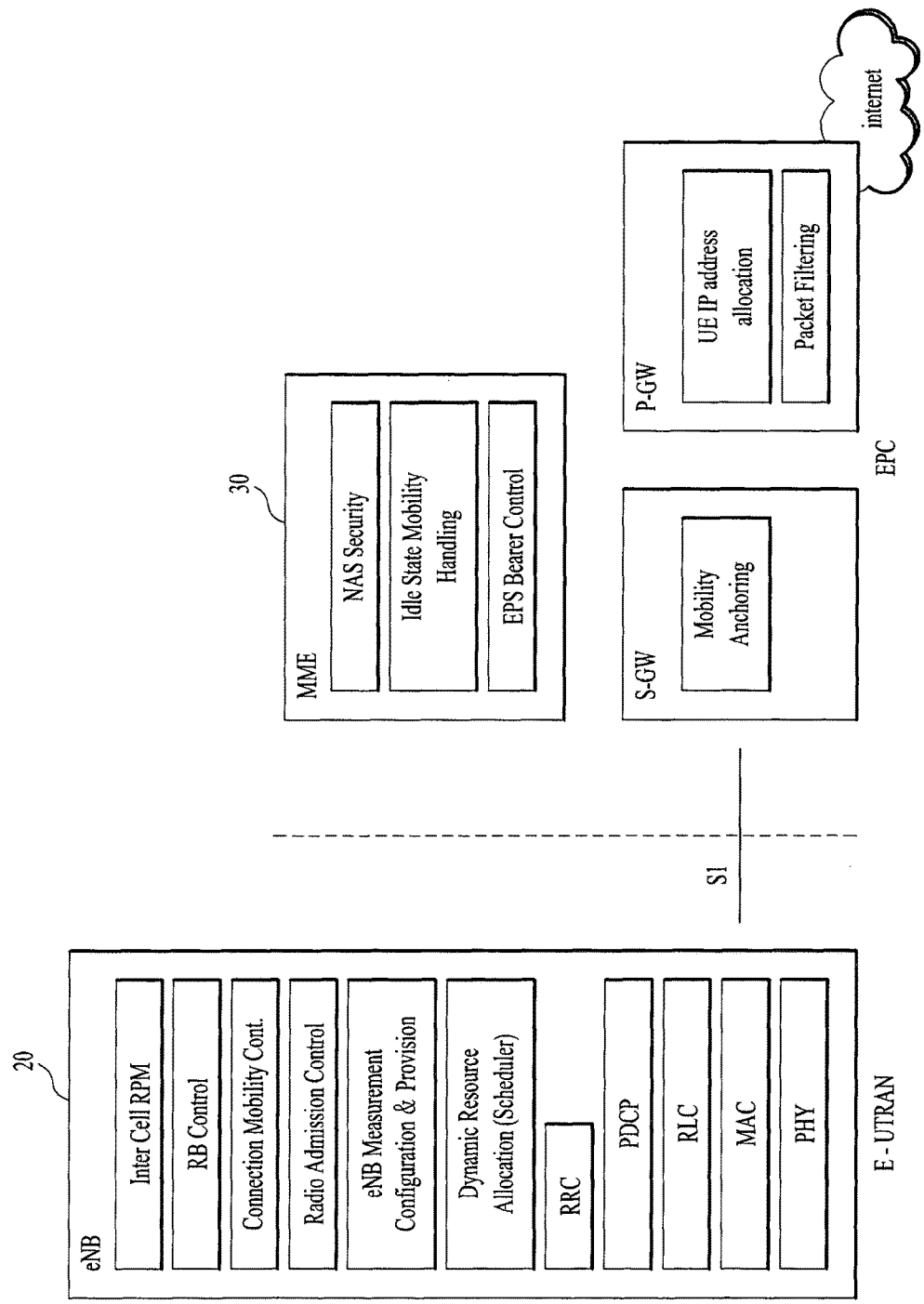
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
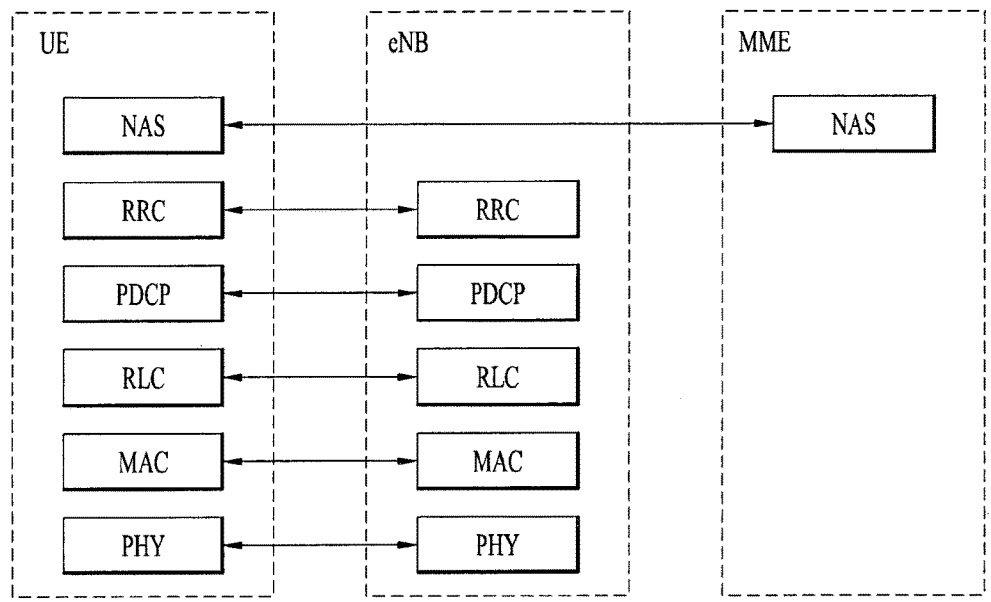
FIG. 3 is a diagram showing a control plane and a user plane of a radio interface protocol between a UE and an E-UTRAN based on a 3rd generation partnership project (3GPP) radio access network standard.
Figure 3:
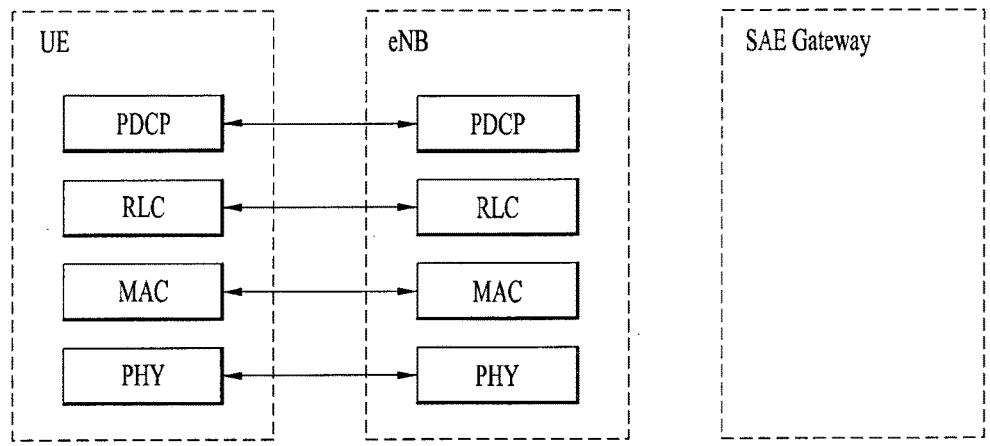

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH). Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
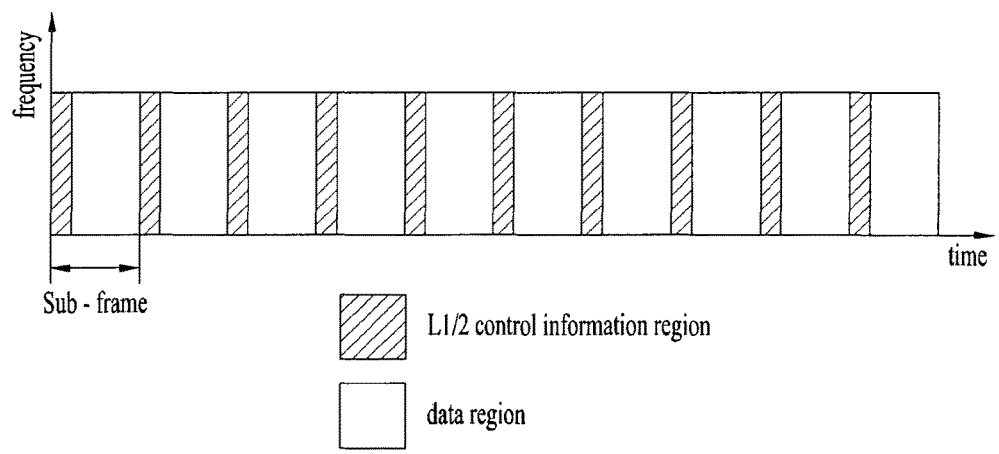
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
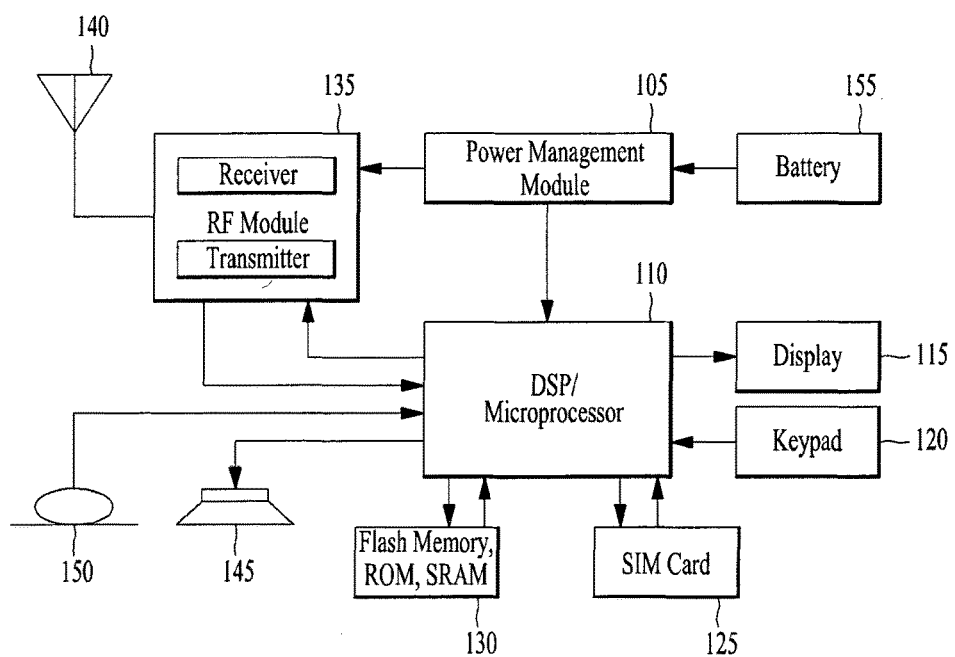
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Recently, Proximity-based Service (ProSe) has been discussed in 3GPP. The ProSe enables different UEs to be connected (directly) each other (after appropriate procedure(s), such as authentication), through eNB only (but not further through Serving Gateway (SGW)/Packet Data Network Gateway (PDN-GW, PGW)), or through SGW/PGW. Thus, using the ProSe, device to device direct communication can be provided, and it is expected that every devices will be connected with ubiquitous connectivity. Direct communication between devices in a near distance can lessen the load of network. Recently, proximity-based social network services have come to public attention, and new kinds of proximity-based applications can be emerged and may create new business market and revenue. For the first step, public safety and critical communication are required in the market. Group communication is also one of key components in the public safety system. Required functionalities are: Discovery based on proximity, Direct path communication, and Management of group communications.

Use cases and scenarios are for example: i) Commercial/social use, ii) Network offloading, iii) Public Safety, iv) Integration of current infrastructure services, to assure the consistency of the user experience including reachability and mobility aspects, and v) Public Safety, in case of absence of EUTRAN coverage (subject to regional regulation and operator policy, and limited to specific public-safety designated frequency bands and terminals)

Figure 6:
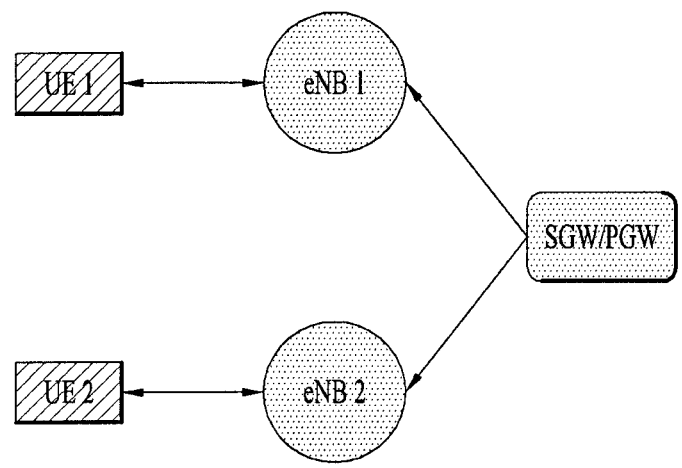
FIG. 6 is an example of default data path for a normal communication.

FIG. 6 is an example of default data path for communication between two UEs. With reference to FIG. 6, even when two UEs (e.g., UE1, UE2) in close proximity communicate with each other, their data path (user plane) goes via the operator network. Thus a typical data path for the communication involves eNB(s) and/or Gateway(s) (GW(s)) (e.g., SGW/PGW).

Figure 7:
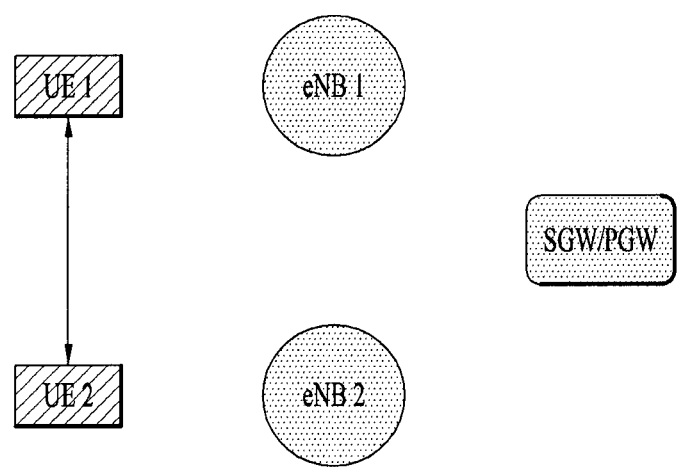
FIGS. 7~8 are examples of data path scenarios for a proximity communication.
Figure 8:
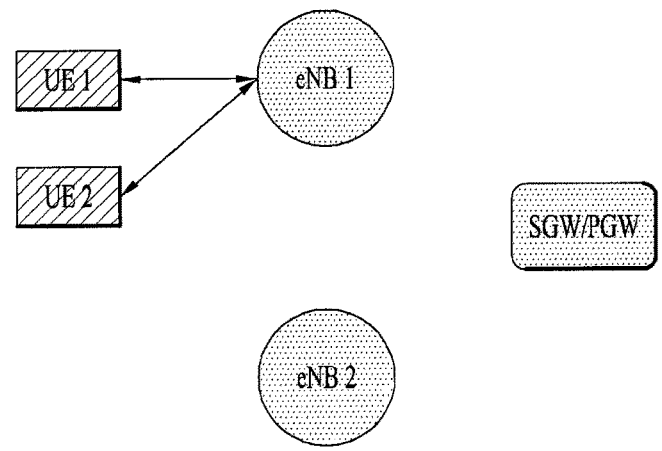

FIGS. 7~8 are examples of data path scenarios for a proximity communication. If wireless devices (e.g., UE1, UE2) are in proximity of each other, they may be able to use a direct mode data path (FIG. 7) or a locally routed data path (FIG. 8). In the direct mode data path, wireless devices are connected directly each other (after appropriate procedure(s), such as authentication), without eNB and SGW/PGW. In the locally routed data path, wireless devices are connected each other through eNB only.

Figure 9:
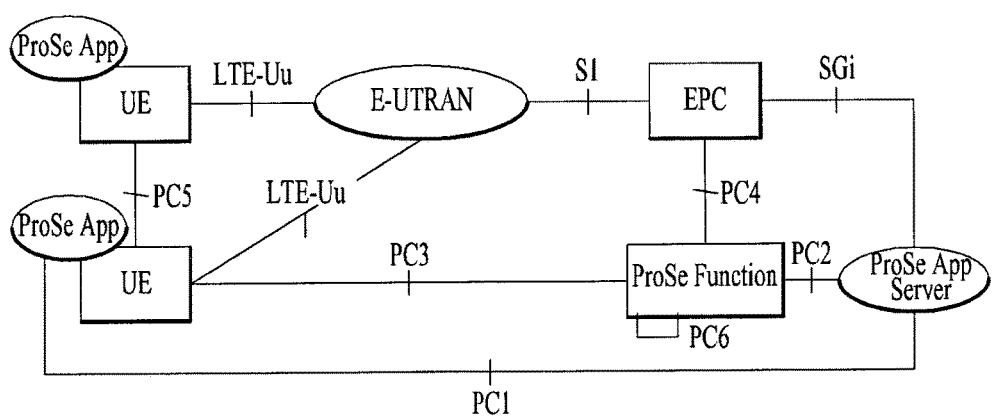
FIG. 9 is a conceptual diagram illustrating for a non-roaming reference architecture.

FIG. 9 is a conceptual diagram illustrating for a non-roaming reference architecture.

PC1~PC5 represents interfaces. PC1 is a reference point between a ProSe application in a UE and a ProSe App server. It is used to define application level signaling requirements. PC2 is a reference point between the ProSe App Server and the ProSe Function. It is used to define the interaction between ProSe App Server and ProSe functionality provided by the 3GPP EPS via ProSe Function. One example may be for application data updates for a ProSe database in the ProSe Function. Another example may be data for use by ProSe App Server in interworking between 3GPP functionality and application data, e.g. name translation. PC3 is a reference point between the UE and ProSe Function. It is used to define the interaction between UE and ProSe Function. An example may be to use for configuration for ProSe discovery and communication. PC4 is a reference point between the EPC and ProSe Function. It is used to define the interaction between EPC and ProSe Function. Possible use cases may be when setting up a one-to-one communication path between UEs or when validating ProSe services (authorization) for session management or mobility management in real time.

PC5 is a reference point between UE to UE used for control and user plane for discovery and communication, for relay and one-to-one communication (between UEs directly and between UEs over LTE-Uu). Lastly, PC6 is a reference point may be used for functions such as ProSe Discovery between users subscribed to different PLMNs.

EPC (Evolved Packet Core) includes entities such as MME, S-GW, P-GW, PCRF, HSS etc. The EPC here represents the E-UTRAN Core Network architecture. Interfaces inside the EPC may also be impacted albeit they are not explicitly shown in FIG. 9.

Application servers, which are users of the ProSe capability for building the application functionality, e.g. in the Public Safety cases they can be specific agencies (PSAP) or in the commercial cases social media. These applications are defined outside the 3GPP architecture but there may be reference points towards 3GPP entities. The Application server can communicate towards an application in the UE.

Applications in the UE use the ProSe capability for building the application functionality. Example may be for communication between members of Public Safety groups or for social media application that requests to find buddies in proximity. The ProSe Function in the network (as part of EPS) defined by 3GPP has a reference point towards the ProSe App Server, towards the EPC and the UE. The functionality may include but not restricted to e.g.:

Interworking via a reference point towards the 3rd party Applications

Authorization and configuration of the UE for discovery and Direct communication Enable the functionality of the EPC level ProSe discovery ProSe related new subscriber data and/handling of data storage; also handling of ProSe identities;

Security related functionality

Provide Control towards the EPC for policy related functionality

Provide functionality for charging (via or outside of EPC, e.g. offline charging)

Figure 10:
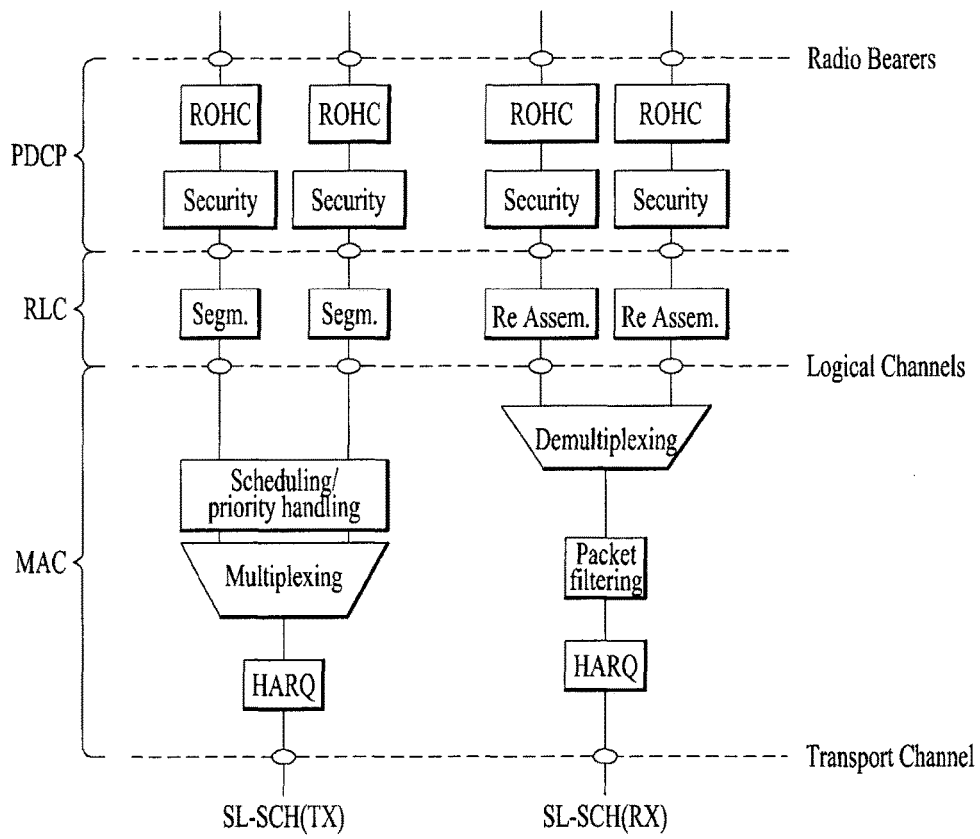
FIG. 10 is a conceptual diagram illustrating for a Layer 2 Structure for Sidelink.

FIG. 10 is a conceptual diagram illustrating for a Layer 2 structure for Sidelink.

The Sidelink is UE to UE interface for ProSe direct communication and ProSe Direct Discovery. Corresponds to the PC5 interface. The Sidelink comprises ProSe Direct Discovery and ProSe Direct Communication between UEs. The Sidelink uses uplink resources and physical channel structure similar to uplink transmissions. However, some changes, noted below, are made to the physical channels. E-UTRA defines two MAC entities; one in the UE and one in the E-UTRAN. These MAC entities handle the following transport channels additionally, i) sidelink broadcast channel (SL-BCH), ii) sidelink discovery channel (SL-DCH) and iii) sidelink shared channel (SL-SCH).

Basic transmission scheme: the Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

Physical-layer processing: the Sidelink physical layer processing of transport channels differs from UL transmission in the following steps:

i) Scrambling: for PSDCH and PSCCH, the scrambling is not UE-specific;

ii) Modulation: 64 QAM is not supported for Sidelink.

Physical Sidelink control channel: PSCCH is mapped to the Sidelink control resources. PSCCH indicates resource and other transmission parameters used by a UE for PSSCH.

Sidelink reference signals: for PSDCH, PSCCH and PSSCH demodulation, reference signals similar to uplink demodulation reference signals are transmitted in the 4th symbol of the slot in normal CP and in the 3rd symbol of the slot in extended cyclic prefix. The Sidelink demodulation reference signals sequence length equals the size (number of sub-carriers) of the assigned resource. For PSDCH and PSCCH, reference signals are created based on a fixed base sequence, cyclic shift and orthogonal cover code.

Physical channel procedure: for in-coverage operation, the power spectral density of the sidelink transmissions can be influenced by the eNB.

Figure 11A:
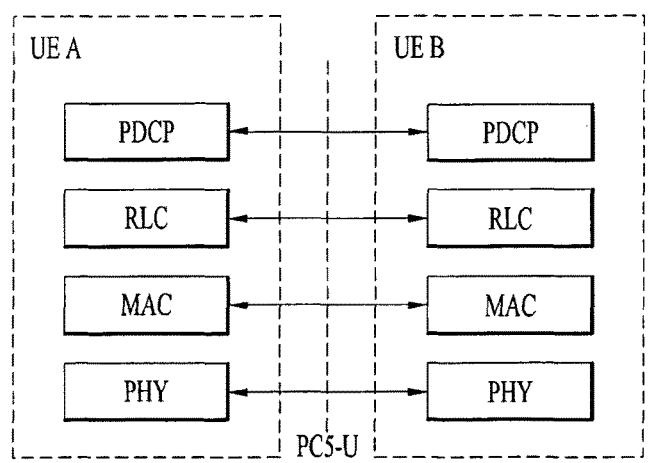
FIG. 11a is a conceptual diagram illustrating for User-Plane protocol stack for ProSe Direct Communication.
Figure 11B:
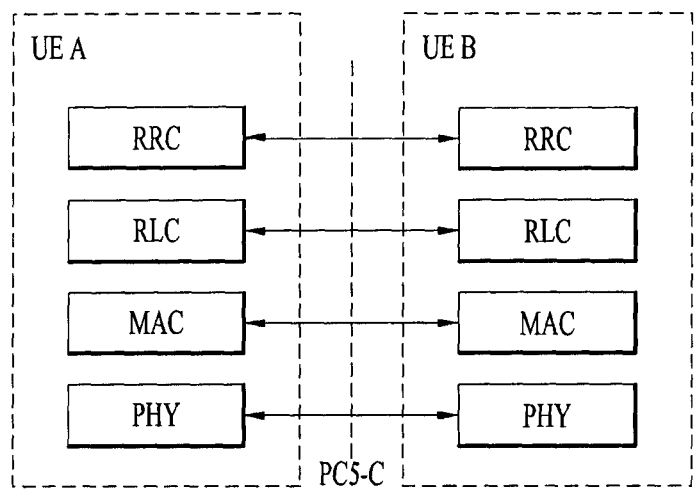
FIG. 11b is Control-Plane protocol stack for ProSe Direct Communication.

FIG. 11a is a conceptual diagram illustrating for User-Plane protocol stack for ProSe Direct Communication, and FIG. 11b is Control-Plane protocol stack for ProSe Direct Communication.

ProSe Direct Communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform ProSe Direct Communication.

In order to perform synchronization SBCCH carries the most essential system information needed to receive other ProSe channels and signals. The SBCCH along with synchronization signal is transmitted with a fixed periodicity of 40 ms. When the UE is in network coverage, the contents of SBCCH are derived from the parameters signaled by the eNB. When the UE is out of coverage, if the UE selects another UE as a synchronization reference, then the content of SBCCH is derived from the received SBCCH; otherwise UE uses pre-configured parameters. There is only one subframe every 40 ms for synchronization signal and SBCCH transmission for in-coverage operation. SIB18 provides the resource information for synchronization signal and SBCCH transmission. There are two preconfigured subframes every 40 ms for out of coverage operation. UE receives synchronization signal and SBCCH in one subframe and transmit synchronization signal and SBCCH on another subframe if UE becomes synchronization source based on defined criterion.

UE performs Prose Direct communication on subframes defined over the duration of Sidelink Control period. The Sidelink Control period is the period over which resources allocated in a cell for Sidelink Control and Sidelink Data transmissions occur. Within the Sidelink Control period the UE sends a Sidelink Control followed by data. Sidelink Control indicates a Layer 1 ID and characteristics of the transmissions (e.g. MCS, location of the resource(s) over the duration of Sidelink Control period, timing alignment).

The UE performs transmission and reception of Uu and PC5 with the following decreasing priority order:
Uu transmission/reception (highest priority);
PC5 ProSe Direct Communication transmission/reception;
PC5 ProSe Direct Discovery transmission/reception (lowest priority).

Figure 12:
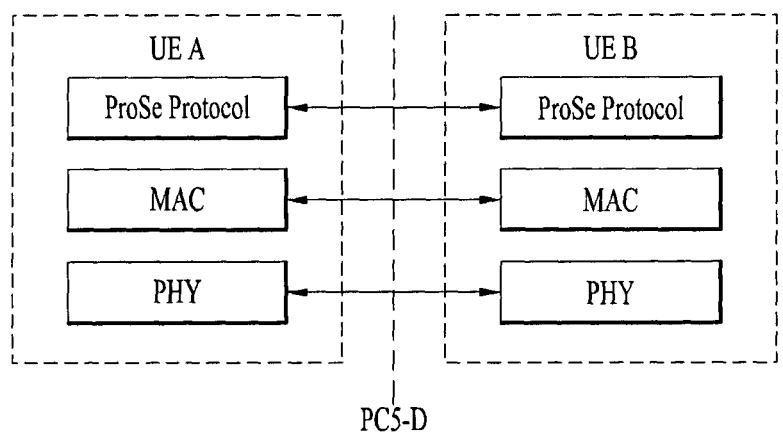
FIG. 12 is a conceptual diagram illustrating for a PC5 interface for ProSe Direct Discovery.

FIG. 12 is a conceptual diagram illustrating for a PC5 interface for ProSe Direct Discovery.

ProSe Direct Discovery is defined as the procedure used by the UE supporting Direct Discovery to discover other UE(s) in its proximity, using E-UTRA direct radio signals via PC5. ProSe Direct Discovery is supported only when the UE is served by E-UTRAN.

Upper layer handles authorization for announcement and monitoring of discovery message. Content of discovery message is transparent to Access Stratum (AS) and no distinction in AS is made for ProSe Direct Discovery models and types of ProSe Direct Discovery.

The UE can participate in announcing and monitoring of discovery message in both RRC_IDLE and RRC CONNECTED states as per eNB configuration. The UE announces and monitors its discovery message subject to the half-duplex constraint.

The UE that participates in announcing and monitoring of discovery messages maintains the current UTC time. The UE that participates in announcing transmits the discovery message which is generated by the ProSe Protocol taking into account the UTC time upon transmission of the discovery message. In the monitoring UE the ProSe Protocol provides the message to be verified together with the UTC time upon reception of the message to the ProSe Function.

There are three range classes. Upper layer authorization provides applicable range class of the UE. Maximum allowed transmission power for each range class is signalled in SIB19. The UE uses the applicable maximum allowed transmission power corresponding to its authorized range class. This puts an upper limit on the determined transmit power based on open loop power control parameters.

Figure 13A:
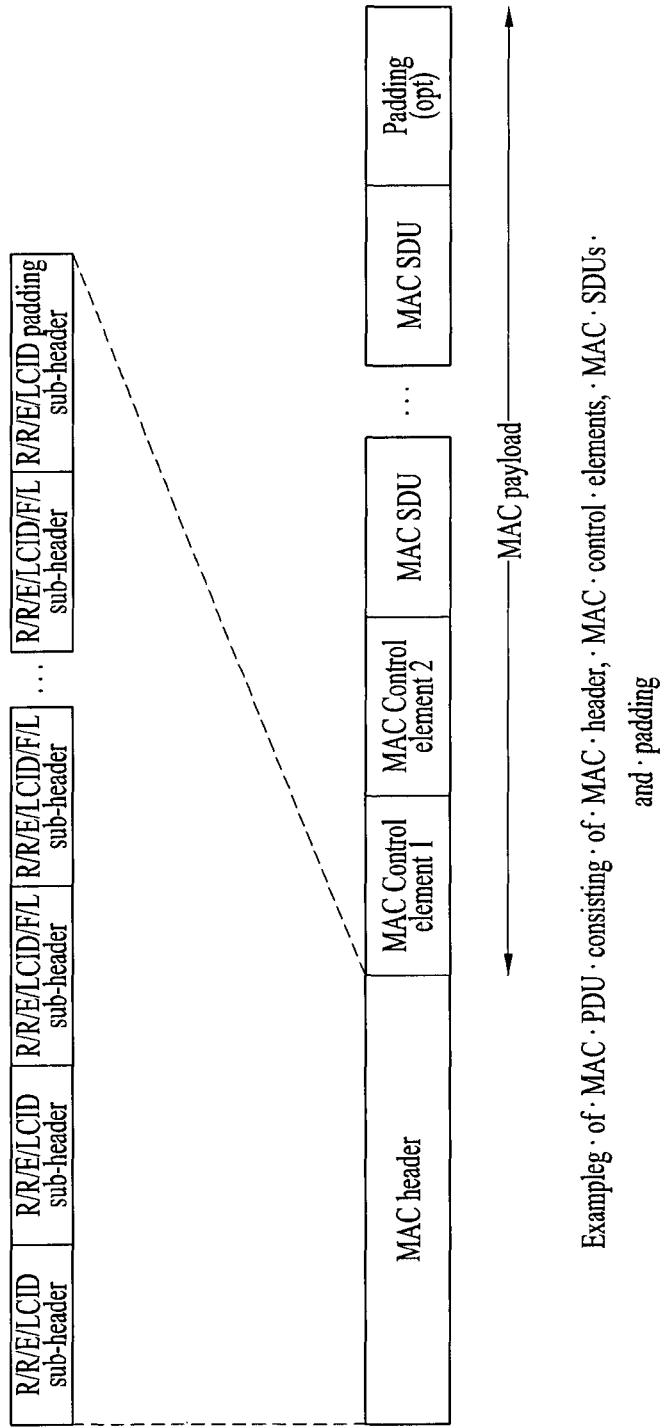
FIG. 13a~FIG. 13c are conceptual diagrams illustrating for a MAC PDU structure.
Figure 13B:
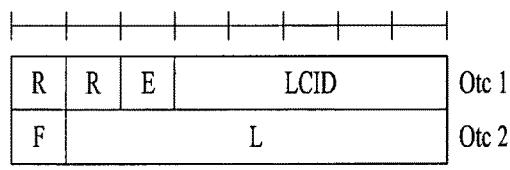
Figure 13B:
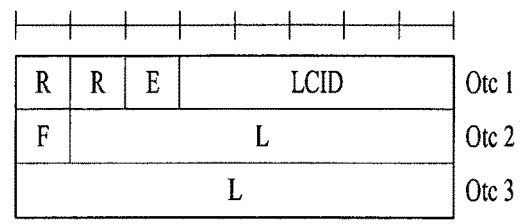
Figure 13C:
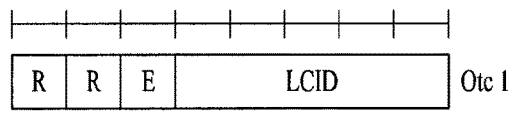

FIG. 13a~FIG. 13c are conceptual diagrams illustrating for a MAC PDU structure.

A MAC PDU consists of a MAC header, zero or more MAC Service Data Units (MAC SDU), zero, or more MAC control elements, and optionally padding; as described in FIG. 13a. Both the MAC header and the MAC SDUs are of variable sizes.

A MAC PDU header consists of one or more MAC PDU subheaders; each subheader corresponds to either a MAC SDU, a MAC control element or padding.

A MAC PDU subheader consists of the six header fields R/R/E/LCID/F/L but for the last subheader in the MAC PDU and for fixed sized MAC control elements. The last subheader in the MAC PDU and subheaders for fixed sized MAC control elements consist solely of the four header fields R/R/E/LCID. A MAC PDU subheader corresponding to padding consists of the four header fields R/R/E/LCID.

MAC PDU subheaders have the same order as the corresponding MAC SDUs, MAC control elements and padding. MAC control elements are always placed before any MAC SDU.

Padding occurs at the end of the MAC PDU, except when single-byte or two-byte padding is required. Padding may have any value and the UE shall ignore it. When padding is performed at the end of the MAC PDU, zero or more padding bytes are allowed.

When single-byte or two-byte padding is required, one or two MAC PDU subheaders corresponding to padding are placed at the beginning of the MAC PDU before any other MAC PDU subheader. A maximum of one MAC PDU can be transmitted per TB per UE. A maximum of one MCH MAC PDU can be transmitted per TTI.

The MAC header is of variable size and consists of the following fields:

1) LCID: The Logical Channel ID field identifies the logical channel instance of the corresponding MAC SDU or the type of the corresponding MAC control element or padding as described in Tables 1, Table 2 and Table 3 for the DL-SCH, UL-SCH and MCH respectively. There is one LCID field for each MAC SDU, MAC control element or padding included in the MAC PDU. In addition to that, one or two additional LCID fields are included in the MAC PDU, when single-byte or two-byte padding is required but cannot be achieved by padding at the end of the MAC PDU. The LCID field size is 5 bits.

TABLE 1

Values of LCID for DL-SCH

| Index | LCID values |
|---|---|
| 00000 | CCCH |
| 00001-01010 | Identity of the logical channel |
| 01011-11010 | Reserved |
| 11011 | Activation/Deactivation |
| 11100 | UE Contention Resolution Identity |
| 11101 | Timing Advance Command |
| 11110 | DRX Command |
| 11111 | Padding |

TABLE 2

Values of LCID for UL-SCH

| Index | LCID values |
|---|---|
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |

TABLE 2-continued

Values of LCID for UL-SCH

| Index | LCID values |
| --- | --- |
| 11100 | Truncated BSR |
| 11101 | Short BSR |
| 11110 | Long BSR |
| 11111 | Padding |

TABLE 3

Values of LCID for MCH

| Index | LCID values |
| --- | --- |
| 00000 | MCCH (see note) |
| 00001-11100 | MTCH |
| 11101 | Reserved |
| 11110 | MCH Scheduling Information |
| 11111 | Padding |

NOTE:
If there is no MCCH on MCH, an MTCH could use this value.

2) L: The Length field indicates the length of the corresponding MAC SDU or variable-sized MAC control element in bytes. There is one L field per MAC PDU subheader except for the last subheader and subheaders corresponding to fixed-sized MAC control elements. The size of the L field is indicated by the F field.

3) F: The Format field indicates the size of the Length field as indicated in Table 4. There is one F field per MAC PDU subheader except for the last subheader and subheaders corresponding to fixed-sized MAC control elements. The size of the F field is 1 bit. If the size of the MAC SDU or variable-sized MAC control element is less than 128 bytes, the value of the F field is set to 0, otherwise it is set to 1.

TABLE 4

Values of F field

| Index | Size of Length field (in bits) |
| --- | --- |
| 0 | 7 |
| 1 | 15 |

4) E: The Extension field is a flag indicating if more fields are present in the MAC header or not. The E field is set to "1" to indicate another set of at least R/R/E/LCID fields. The E field is set to "0" to indicate that either a MAC SDU, a MAC control element or padding starts at the next byte.

5) R: Reserved bit, set to "0".

In the legacy system, the Logical Channel ID (LCID) is used to identify the logical channel instance of the corresponding MAC SDU or the type of the corresponding MAC control element or padding. There is one LCID field for each MAC SDU, MAC control element or padding included in the MAC PDU. The Logical Channel ID is allocated for each logical channel when the Radio Bearer is setup. Currently, there are 8 values available for data radio bearer (3 to 10).

For D2D communication, the LCID should be allocated to D2D Radio Bearer (D2DRB). There may be multiple D2DRBs configured for a UE. According to the prior art, the LCID should be allocated to each D2DRB. However, D2DRB is used when the UE is out of eNB coverage, and therefore the LCID should be allocated or preconfigured before the D2DRB is setup. Considering the limited number of available LCID values, it is very risky to allocate or preconfigure multiple LCID values for D2DRBs.

Additionally, for D2D communication, in order to notice more quickly whether a UE is a target UE targeted by a source device among a plurality of target devices or not, it needs to check its identity whether it is a target UE targeted by a source device at a MAC layer. So-called, a concept of layer filtering of the MAC layer may need to be introduced.

Figure 14:
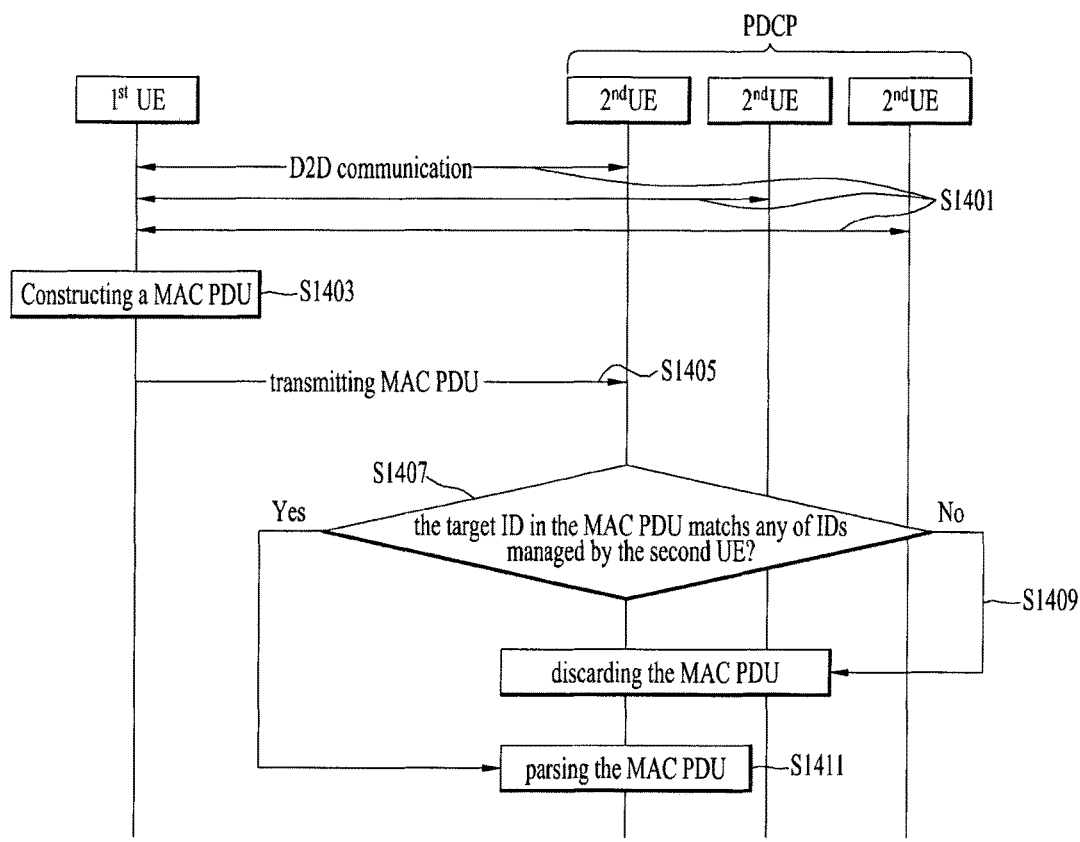
FIG. 14 is a conceptual diagram for configuring MAC PDU for D2D communication according to embodiments of the present invention.

FIG. 14 is a conceptual diagram for configuring a MAC PDU for D2D communication according to embodiments of the present invention.

If a first UE and a second UE are communicated each other, as called D2D communication (S1401), a first UE constructs a MAC PDU including a source ID, a target ID, a plurality of logical channel IDs and a plurality of MAC SDUs (S1403).

Preferably, the first UE is a source UE and the second UE is a target UE.

Preferably, the source ID is in a first field, the target ID is in a second field, the logical channel IDs are in a plurality of third fields and the plurality of MAC SDUs are in a plurality of fourth fields, respectively.

Preferably, in step of S1403, the first UE adds all MAC SDUs transmitted via a plurality logical channels corresponding to same target ID, adds the plurality of logical channel IDs, and adds a source ID indicating an identity of the first UE, and then adds a target ID which at least one second UE shares commonly, but it is not limited thereto.

The source ID identifies the sender of the data in sidelink ProSe Direct Communication. The source ID is 24 bits long and is used together with ProSe Layer-2 Group ID and LCID for identification of the RLC UM entity and PDCP entity in the receiver.

The target ID identifies the target of the data in sidelink ProSe Direct Communication. The target ID is 24 bits long and is split in the MAC layer into two bit strings:

i) One bit string is the LSB part (8 bits) of target ID and forwarded to physical layer as Sidelink Control Layer-1 ID. This identifies the target of the intended data in Sidelink Control and is used for filtering of packets at the physical layer. ii) Second bit string is the MSB part (16 bits) of the target ID and is carried within the MAC header. This is used for filtering of packets at the MAC layer.

No Access Stratum signalling is required for group formation and to configure source ID, target ID and Sidelink Control L1 ID in the UE. These identities are either provided by higher layer or derived from identities provided by higher layer. In case of groupcast and broadcast, the ProSe UE ID provided by higher layer is used directly as the source ID and the ProSe Layer-2 Group ID provided by higher layer is used directly as the target ID in the MAC layer.

The logical channel IDs is a LCID value allocated or preconfigured for all D2D logical channels. And the one MAC SDU identified by the logical channel IDs can contain payload of multiple D2D logical channels.

Preferably, the source ID and the target ID are IDs used in an MAC entity.

The first UE transmits the MAC PDU to at least one second UE via an interface (S1405).

Preferably the interface is configured between the first UE and the at least one second UE directly. The interface is a PC5 interface, but it is not limited thereto.

The second UE determines whether the target ID matchs any of IDs managed by the second UE or not (S1407).

If the target ID doesn't match any of IDs managed by the second UE, the second UE discards the MAC PDU (S1409). If target ID matchs any of IDs managed by the second UE, the UE considers that the MAC PDU targets to itself, and starts to parse the MAC PDU (S1411).

The steps of S1407 may be called as a concept of layer filtering of the MAC layer. Because the target UE may check whether a MAC PDU transmitted from a source UE is for the target UE or not in a MAC layer, it is faster that the target UE determines the MAC PDU is parsed or discarded than the target UE checks its identity in a physical layer. In case of D2D communication system comprising a plurality UEs, there may be lots of noises disturbing direct D2D communication. The layer filtering of the MAC layer can be a good method for effective removing noises for D2D communication system.

Figure 15:
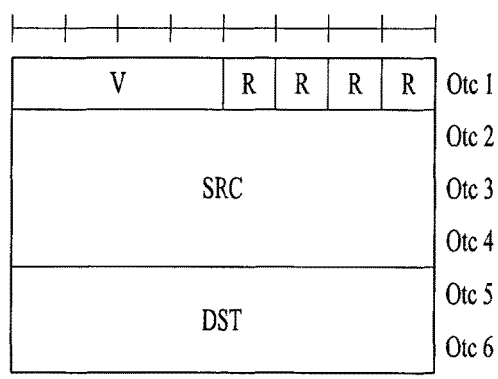
FIGS. 15 and 16 are examples of MAC PDU structures according to embodiments of the present invention.
Figure 16:
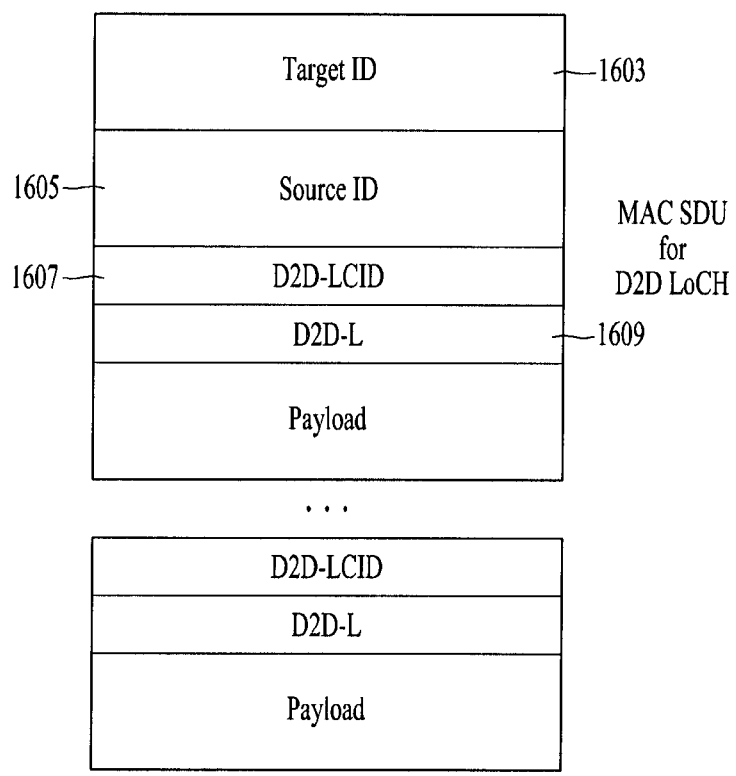

FIGS. 15 and 16 are examples of MAC PDU structures including a source ID and a target ID for D2D communication according to embodiments of the present invention.

FIG. 15 illustrates a case of a MAC subheader including a source ID and a target ID for D2D communication according to embodiments of the present invention. The MAC subheader in FIG. 15 consists of the seven header fields V/R/R/R/R/SRC/DST. The MAC header is of variable size and consists of the following fields: i) 'V' is a MAC PDU format version number field indicates which version of the SL-SCH subheader is used. In this version of the specification only one format version is defined, and this field shall therefore be set to "0001". The V field size is 4 bits, ii) 'SRC' is the source ID (or Source Layer-2 ID field) carries the identity of the source. It is set to the ProSe UE ID. The SRC field size is 24 bits, iii) 'DST' is a DST field carries the 16 most significant bits of a target ID (or Destination Layer-2 ID). The Destination Layer-2 ID is set to the ProSe Layer-2 Group ID, 'R' is aeserved bit, set to "0".

FIG. 16 illustrates a case of a MAC PDU including a source ID and a target ID for D2D communication according to embodiments of the present invention.

- LCID=D2D (1601): One value of LCID indicates the associated MAC SDU contains the user data or control information of D2D.
- Target ID (1603): Indicates the ID of the intended recipient. If the Target ID is not matched with any of the IDs managed by the target UE, the UE discards the MAC PDU. If the Target ID matches with one of the IDs managed by the target UE, the target UE considers that the MAC PDU targets to itself, and starts to parse the MAC PDU.
- Source ID (1605): Indicates the ID of the sender of the packet. The source UE attaches the Source ID as the Target ID when it transmits packet to the Source.
- D2D-LCID (1607): Identifies the D2D logical channel to which the UE delivers the MAC SDU, or identifies the control information related to D2D communication.
- D2D-L (1609): Indicates the length of the payload identified by the D2D-LCID.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a second User Equipment (UE) operating in a wireless communication system, the method comprising:
    receiving, by the second UE, a Medium Access Control (MAC) Protocol Data Unit (PDU) including a source identity (ID), a target ID, a plurality of logical channel IDs (LCIDs) and a plurality of MAC Service Data Units (SDUs) from a first UE via an interface,
    wherein the interface is configured for one-to-one communication between the second UE and the first UE directly, and
    wherein each of the plurality of LCIDs identifying a logical channel for one-to-one communication corresponds to a respective MAC SDU for the logical channel identified by a corresponding LCID; and
    delivering the MAC PDU to an upper layer if the target ID matches any one of a plurality of IDs managed by the second UE,
    wherein the source ID identifies the first UE, and the target ID identifies the second UE in case of one-to-one communication.

2. The method according to claim 1, further comprising:
    discarding the MAC PDU if the target ID does not match any one of a plurality of IDs managed by the second UE.

3. The method according to claim 1, wherein the source ID and the target ID are used in a MAC entity.

4. A second User Equipment (UE) for operating in a wireless communication system, the second UE comprising:
    a Radio Frequency (RF) module; and
    a processor configured to:
    receive, via the RF module, a Medium Access Control (MAC) Protocol Data Unit (PDU) including a source identity (ID), a target ID, a plurality of logical channel IDs (LCIDs) and a plurality of MAC Service Data Units (SDUs) from a first UE via an interface,
    wherein the interface is configured between the second UE and the first UE directly, and
    wherein each of the plurality of LCIDs identifying a logical channel for one-to-one communication corresponds to a respective MAC SDU for the logical channel identified by a corresponding LCID, and
    deliver the MAC PDU to an upper layer if the target ID matches any one of a plurality of IDs managed by the second UE,
    wherein the source ID identifies the first UE, and the target ID identifies the second UE in case of one-to-one communication.

5. The second UE according to claim 4, wherein the processor is further configured to discard the MAC PDU if the target ID does not match any one of a plurality of IDs managed by the second UE.

6. The second UE according to claim 4, wherein the source ID and the target ID are used in a MAC entity.

* * * * *